United States Patent [19]

Roe et al.

[11] Patent Number: 4,716,384

[45] Date of Patent: Dec. 29, 1987

[54] MODULATORS

[75] Inventors: Malcolm D. M. Roe, London; Michael E. Hicks, Tring, both of England

[73] Assignee: Crosfield Electronics Limited, London, England

[21] Appl. No.: 727,325

[22] Filed: Apr. 25, 1985

[30] Foreign Application Priority Data

May 1, 1984 [GB] United Kingdom ............... 8411079
Nov. 5, 1984 [GB] United Kingdom ............... 8427912

[51] Int. Cl.$^4$ .................... H01S 3/10; H04N 5/76; G01D 15/14
[52] U.S. Cl. .................................. 332/7.51; 369/106
[58] Field of Search ............... 332/7.51; 358/298, 302; 369/106

[56] References Cited

U.S. PATENT DOCUMENTS

| | | | |
|---|---|---|---|
| Re. 30,974 | 6/1982 | DeMoss et al. ............. | 369/106 |
| 2,292,166 | 8/1942 | Singer ......................... | 369/106 |
| 2,357,625 | 9/1944 | Albin .......................... | 369/106 |
| 3,579,145 | 3/1969 | Lange ......................... | 332/7.51 |
| 3,787,888 | 1/1974 | Haskal ........................ | 369/109 |
| 3,875,400 | 4/1975 | Pao et al. .................... | 332/7.51 |
| 3,895,317 | 7/1975 | Burton ........................ | 332/7.51 |
| 3,925,735 | 12/1975 | Ozeki et al. ................ | 332/7.51 |
| 3,962,576 | 6/1976 | Kuhl et al. ................. | 332/7.51 |
| 4,022,970 | 5/1977 | Vandling .................... | 358/298 |
| 4,025,189 | 5/1977 | Pugsley ...................... | 358/298 |
| 4,093,964 | 6/1978 | Aughton ..................... | 358/298 |
| 4,110,796 | 8/1978 | Aughton ..................... | 358/298 |
| 4,114,180 | 9/1978 | Kayanuma ................. | 369/109 |
| 4,125,864 | 11/1978 | Aughton .................... | 358/298 |
| 4,151,563 | 4/1979 | Gast et al. .................. | 358/302 |
| 4,162,398 | 7/1979 | Kayanuma ................. | 369/106 |
| 4,317,236 | 2/1982 | Bosch ......................... | 332/7.51 |
| 4,380,015 | 4/1983 | Ho et al. ..................... | 369/106 |
| 4,456,914 | 7/1984 | Winslow .................... | 332/7.51 |
| 4,549,190 | 10/1985 | Ohara ......................... | 369/106 |

FOREIGN PATENT DOCUMENTS

58-24119 2/1983 Japan .
WO80/02467 11/1980 PCT Int'l Appl. .

OTHER PUBLICATIONS

Instr. and Exp. Tech., vol. 15, No. 3 part 2 (6/72) Gisin et al.

Primary Examiner—Salvatore Cangialosi
Attorney, Agent, or Firm—Sughrue, Mion, Zinn, Macpeak and Seas

[57] ABSTRACT

An exposure system and method comprising a radiation generator (15'); and a modulator (4) which comprises a device for controlling the transmission of radiation passing through the modulator in accordance with an applied control function, the response characteristic of the modulator to the control function exhibiting a maximum or minimum and onto which radiation from the generator is incident. A microprocessor (19) controls the transmission condition of the modulator (4), and is responsive to predetermined control signals during an exposing stage and, during a compensation stage prior to the exposing stage, generates a test control function having a DC component and a cyclically varying component for application to the modulator. A photodiode (17) monitors radiation transmitted through the modulator, and a phase detector (18) detects the phase relationship between the cyclical component of the transmitted radiation and the cyclically varying component of the test control function and determines the position of the DC component of the test control function along the response characteristic of the modulator. The microprocessor (19) determines a correction function for application to the modulator (4) to compensate for any change in the response characteristic.

10 Claims, 6 Drawing Figures

MODULATORS

BACKGROUND OF THE INVENTION

The invention relates to a method and apparatus for compensating for changes in the response characteristic of a modulator particularly a beam modulator for use in an image generation system.

In conventional image generation systems, an original image is scanned to generate signals representing for example cyan, magenta, and yellow which, after processing, are fed to an exposing beam assembly which generates one or more exposing beams which are modulated in accordance with the scanned signals. The exposing beams impinge on a record medium which may be a light sensitive sheet or gravure cylinder. In the case of half-tone imaging, the control information is modified with half-tone dot information. Typically, the intensity of an exposing beam is controlled by a beam modulator.

In this context, a modulator comprises a device for controlling the transmission of radiation passing through the modulator in accordance with an applied control function, the response characteristic of the modulator to the control function exhibiting a maximum or minimum. Such a modulator is hereinafter referred to as of the kind described. Typically, the response characteristic will be 'U' or 'V'-shaped and conveniently is symmetrical about the maximum or minimum. In this context 'maximum' refers to maximum radiation transmission and 'minimum' to minimum transmission or extinction.

A typical beam modulator of the kind described comprises an electro-optical modulator which responds to an applied voltage. Typically, the response characteristic has a $\sin^2$ form, that is the intensity of light transmitted varies in a $\sin^2$ fashion in response to applied voltage.

In practice, the response characteristic of conventional modulators is not constant and tends to vary and, in some cases, drift over fairly short time periods due to temperature variations. Typical drifts are in the order of tens of volts. Where a number of such modulators are mounted together, such as in the Crosfield Magnascan 645 system, variations greater than about 2 volts in response characteristics can lead to the generation of moire patterns in some colour separations which is undesirable.

Various proposals have been made for compensating for this drift. U.S. Pat. No. 3,579,145 describes a system in which a pilot signal is superimposed upon the information bearing modulating signal. The resulting modulation produced by the pilot signal is compared with a reference signal in a phase detector and a control signal is generated which is used to counteract any drift of the operating point.

Similar approaches to that of the U.S. specification mentioned above are described in a paper entitled "Electronic Stabilisation of the Operating Point of an Electro-Optical Light Modulator with Low Control Voltages" in Radio Engineering and Electronic Physics, Vol 15, No. 9 pp 1659-1662 and in a paper entitled "Automatic Adjustment of the Position of the Operating Point of an electro-optical modulator" in Instruments and Experimental Techniques Vol 25, No. 5, part 2 pp. 1231-1233.

All these techniques work in real time. This is possible because they describe the information bearing modulating signal as a pulse code modulated (PCM) signal. In PCM a small change in amplitude is not relevant. However, these systems are not applicable in image generation systems where a low amplitude signal instead of a zero amplitude signal is very significant and undesirable.

SUMMARY OF THE INVENTION

In accordance with one aspect of the present invention, we provide a method of exposing a record medium to radiation in which during an exposing stage the radiation passes through a modulator of the kind described whereby the exposure of the record medium to the radiation is controlled by applying a first control function to the modulator, and in which during a compensation stage a test control function having a DC component and a cyclically varying component is applied to the modulator; radiation transmitted through the modulator is monitored; the phase relationship between the cyclical component of the transmitted radiation and the cyclically varying component of the test control function is detected to determine the position of the DC component of the test control function along the response characteristic of the modulator; and a correction function is determined for application to the modulator to compensate for any change in the response characteristic, the method being characterised in that the compensation stage precedes the exposing stage.

We have recognised that the response characteristic of conventional modulators does remain reasonably constant for relatively short periods corresponding at least to the period for exposing a colour separation in an image generation method and thus it is possible to obtain a satisfactory result by carrying out the compensation stage prior to the exposing stage. This has a further advantage in that during the compensation stage, a test control function can be used which comprises a large signal leading to simpler and cheaper detection electronics.

Since the response characteristic of the modulator exhibits a maximum or minimum it is possible to determine by monitoring the phase relationship between the cyclical component of the transmitted beam and the cyclically varying component of the test control function, whether the DC component lies along a descending or ascending portion of the response characteristic. Thus, the phase relationship is determined by the way in which the intensity of the transmitted radiation fluctuates with respect to the cyclically varying component of the test control function. Preferably, the method is repeated one or more times to determine the optimum correction function.

This invention avoids the problems of changing response characteristic outlined above by automatically determining a suitable correction function. Preferably, the correction function is applied as a bias function to the modulator but alternatively it may be algebraically summed with subsequent control functions.

Conveniently the DC component of the test control function has a value which is expected to cause either maximum or minimum radiation transmission. Minimum radiation transmission (extinction) is preferable since this is more important for correct operation.

In the case of an electro-optical beam modulator, the test control function and the correction function will comprise applied voltages. Conveniently, the correction function is applied as a bias voltage.

Preferably, the cyclically varying component of the control function has a square wave form.

In one example, wherein a plurality of beams of radiation pass through respective ones of a plurality of modulators, the method further comprises, during the compensation stage, causing the beams of radiation to impinge on a common detector and carrying out the steps of the compensation stage on each modulator in turn, the component of the radiation incident on the detector having a cyclically varying intensity being monitored.

The invention is particularly applicable to image generation systems such as the Crosfield Magnascan 645 system in which a number of beam modulators are arranged side by side to generate a corresponding number of exposing beams. Conveniently, before each image is scanned onto a record medium, the test control function is applied to each beam modulator in turn and a bias voltage applied to that beam modulator is adjusted to achieve beam extinction. The invention is particularly applicable in this system because it is not generally possible to distinguish between beams transmitted through individual modulators. By imposing the test control function on each modulator in turn, the affect of that modulator can be detected by detecting an oscillating component in the composite transmitted beam (comprising six subsidiary beams).

In accordance with a second aspect of the present invention, an exposure system comprises a radiation generator; a modulator of the kind described onto which radiation from the generator is incident; control means for controlling the transmission condition of the modulator, the control means being responsive to predetermined control signals during an exposing stage and, during a compensation stage prior to the exposing stage, generating a test control function having a DC component and a cyclically varying component for application to the modulator; monitoring means for monitoring radiation transmitted through the modulator; detecting means for detecting the phase relationship between the cyclical component of the transmitted radiation and the cyclically varying component of the test control function and for determining the position of the DC component of the test control function along the response characteristic of the modulator; and calculating means for determining a correction function for application to the modulator to compensate for any change in the response characteristic.

This aspect of the invention is particularly suitable for automatic application and conveniently the control means and calculating means comprise a suitably programmed micro-computer.

BRIEF DESCRIPTION OF THE DRAWINGS

An image generation system for carrying out two examples of a method and incorporating two examples of exposure systems in accordance with the present invention will now be described with reference to the accompanying drawings, in which:

FIGS. 4A–4C illustrate waveforms of a cyclic component of a test control voltage, and the waveforms corresponding to two different detected intensities respectively;

DETAILED DESCRIPTION OF THE PREFERRED EMBODIMENTS

Figure 1:
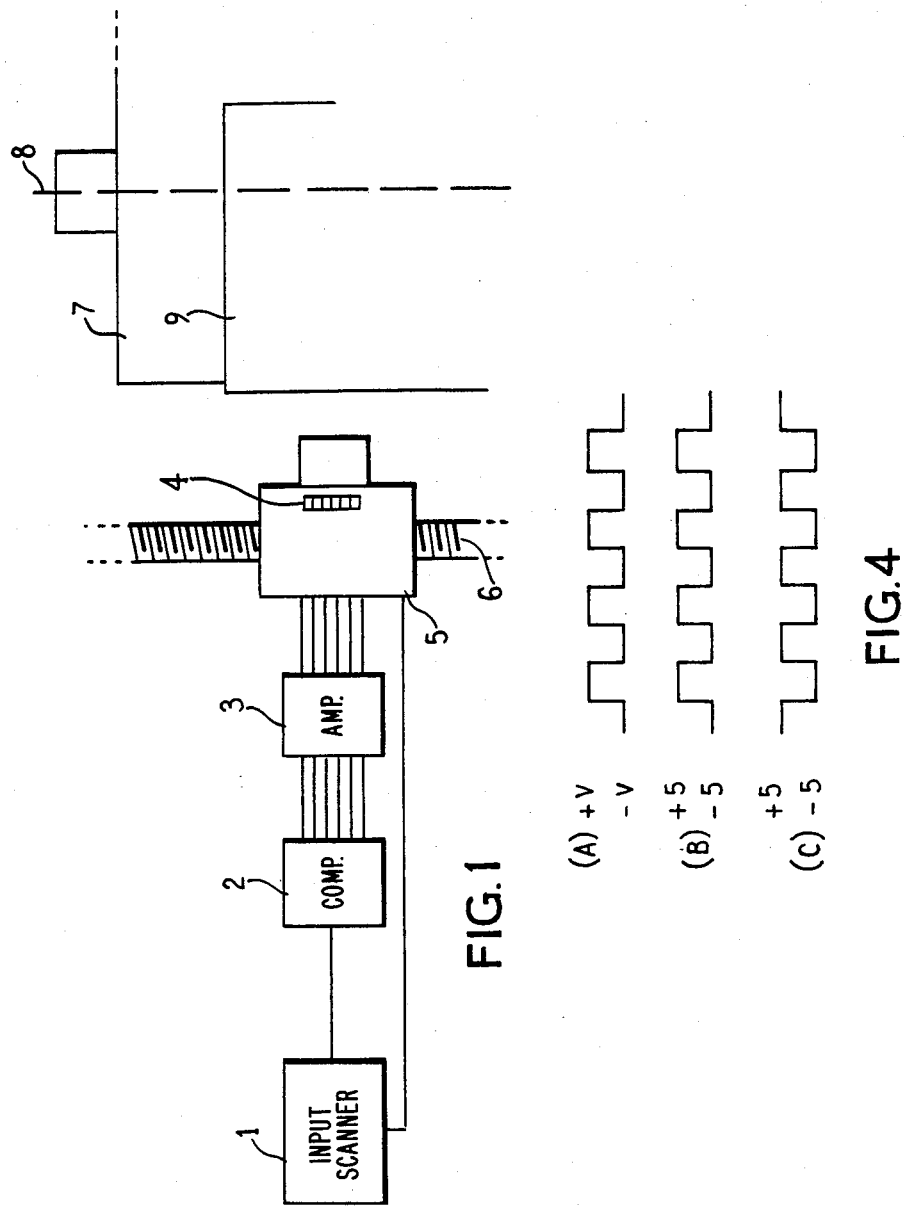
FIG. 1 is a block diagram of the system.

The system illustrated in FIG. 1 comprises an input scanner 1 of conventional form such as provided in our Crosfield Magnascan 645 system. The output from the input scanner 1 comprises control signals for each of a number of colour separations such as cyan, magenta, yellow and black which are fed in turn to six laser beam computers 2. Each laser beam computer 2 actuates via a respective amplifier 3 a laser beam modulator 4. In this system, there are provided six beam modulators 4 arranged side by side which are controlled together by their respective beam computers 2. The modulators 4 are mounted in an exposing head 5 mounted on a lead screw 6. The exposing head 5 is positioned adjacent a cylinder 7 rotatable about an axis 8 and which carries a record medium 9. In use, the cylinder 7 rotates about the axis 8 while the lead screw 6 is rotated at a comparatively low speed so that the six laser beams controlled by the beam modulators 4 expose successive circumferential strips of the record medium 9.

The beam modulators 4 are controlled by the beam computers 2 so that a half-tone dot representation of an original image scanned by the input scanner 1 is generated in the form of a number of colour separations on the record medium 9, the beam modulators 4 being controlled in response to colour density information supplied by the input scanner 1 and in accordance with half-tone dot information supplied by the beam computers 2.

Typically, the beam modulators 4 are electro-optical modulators controlled by an applied voltage. An example of typical beam modulators is shown in U.S. Pat. No. 4,025,189 where the modulators comprise an electro-optical material known as PLZT.

Figure 5:
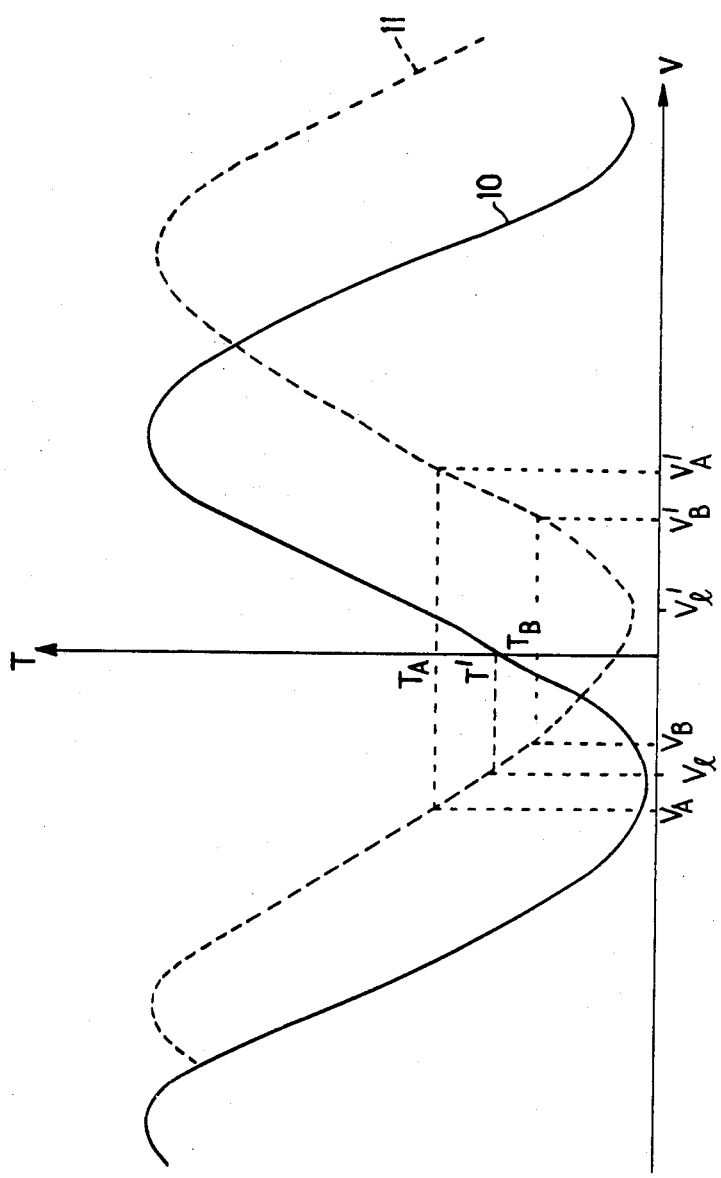
FIG. 5 illustrates the response characteristic of a beam modulator.

The response of a typical beam modulator to an applied voltage is illustrated in FIG. 5 where it will be seen that the transmittance (T) of the modulator varies with applied voltage (V) in the form of a $\sin^2$ function as illustrated by a line 10. Typically, the wavelength of the response characteristic is about 600 V, while the ratio between maximum and minimum transmittance is 200:1. It has been found that the response characteristic illustrated by the line 10 in FIG. 5 tends to vary and in some cases drift over time and particularly in response to changes in temperature to such an extent that for a given applied voltage (V) the modulator causes a significantly different degree of transmittance of an applied laser beam. Such a variation is illustrated by a dashed line 11 in FIG. 5. Consequently, it is necessary to compensate for such changes. In the past, this has been achieved by applying a bias voltage to one electrode of the beam modulator and adjusting this bias with a potentiometer. However, this adjustment is very subjective depending on the ability of a field engineer to determine when the adjustment is sufficient and also requires a significant degree of time to carry out. Furthermore, it should be noted that even for a trained field engineer it is difficult to locate beam extinction accurately.

Figure 2:
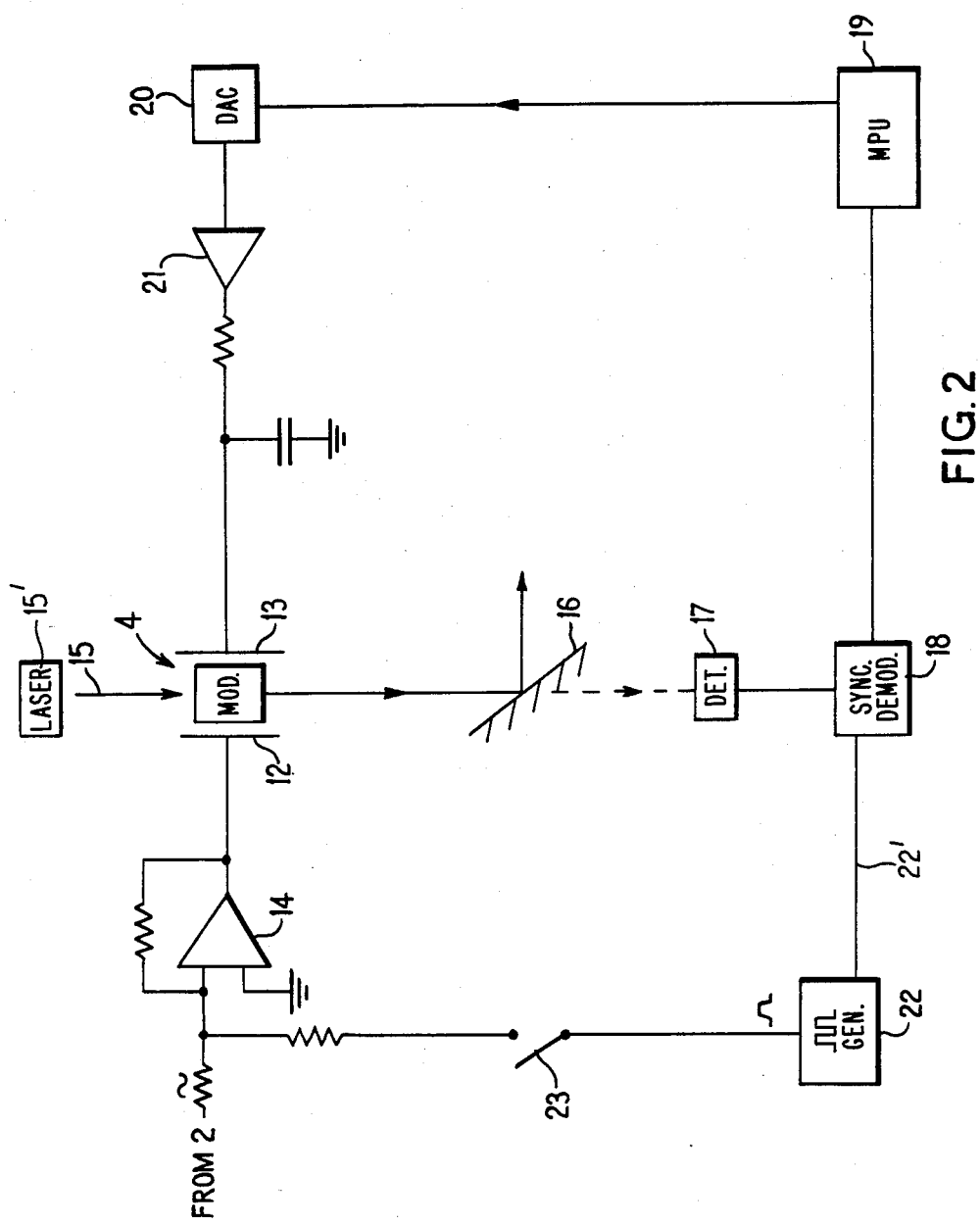
FIG. 2 is a block circuit diagram of one example of the exposure system.

FIG. 2 illustrates an example of the apparatus in more detail for use with one modulator. It should be readily apparent to a skilled person how to extend this to further modulators. A single modulator is indicated at 4 and is controlled by a pair of electrodes 12, 13. A varying control voltage is applied to the electrode 12 via an amplifier 14 (part of amplifiers 3). The control voltage originates from one of the beam computers 2 (not shown in FIG. 2) and varies in such a way as to define a half-tone dot of the correct size for the colour separation in question at the particular pixel being exposed. A laser beam from a laser 15' is split by a conventional beam splitter (not shown) into six separate subsidiary beams one of which 15 is shown in FIG. 2. The beam 15 passes through the modulator 4 and impinges on a semi-silvered mirror 16 where it is partially reflected towards the record medium 9 (not shown in FIG. 2). A non-reflected portion of the laser beam 15 passes through the mirror 16 and is received by a conventional detector 15 and a.c. coupled amplifier 17 which amplifies the intensity of the laser beam 15 impinging on the detector. The detector may comprise a photodiode such as a Centronic OSD5O-5 connected to an operational amplifier such as a National Semiconductor Corporation (NSC) LF356. The output signal is fed to a synchronous demodulator 18.

In order that the control voltage (V) applied to the electrode 12 results in an expected transmittance through the modulator 4, a bias voltage ($V_e$) is applied to the electrode 13. This bias voltage (shown in FIG. 5) is adjusted so that when no voltage is applied to the electrode 12 beam extinction is achieved. That is, the modulator 4 substantially prevents the transmittance of the laser beam 15 to the mirror 16. In practice, full beam extinction is not generally achieved but the degree of error tends to be insignificant. The control voltage $V_e$ is applied under the control of the micro-processor unit (MPU) of the scanner 1 indicated at 19 such as a 6809 which sends a digital control signal via a latch (not shown) such as a Texas 74LS374 to a digital-to-analogue converter 20 such as a Precision Monolithics Inc DAC08 which outputs the bias voltage signal via an amplifier 21 to the electrode 13.

As has been already mentioned, and as is shown in FIG. 5, the response characteristic of the modulator 4 can vary with time and it will be seen in FIG. 5 that if the response characteristic drifts to the position indicated by the dashed line 11 then the bias voltage $V_e$ applied to the electrode 13 will now correspond to a significant degree of transmittance (T'). It is therefore necessary to adjust the bias voltage to a new value $V_e'$.

To achieve this adjustment automatically, a square wave generator 22 is provided which feeds a square wave voltage signal via a switch 23 to the input of the amplifier 14. The generator 22 may be constituted by a 5 MHz crystal connected to a Standard Microsystems Corpn COM8116. The square wave generated by the generator 22 is illustrated in FIG. 4A and preferably varies over a relatively large range to minimise noise problems. When an adjustment to the bias voltage is to be determined, the square wave signal is fed to the amplifier 14 in response to closure of the switch 23 by the MPU 19 along with a voltage signal corresponding to beam extinction generated by a beam computer 2 and will thus cause the voltage applied to the electrode 12 to oscillate in a square waveform about the beam extinction value. Consequently, the intensity of the laser beam 15 transmitted through the modulator 4 will in general also oscillate in a square waveform. (No oscillation will occur when the modulator is biased exactly at beam extinction). For example, if it is assumed that a bias voltage $V_e$ is already applied to the electrode 13 then the square wave voltage may cause the overall potential difference between the electrodes 12 and 13 to vary from $V_A$ to $V_B$ (shown in FIG. 5). This will cause the intensity of the laser beam 15 to vary between two values $T_A$ and $T_B$. However, as has been mentioned above, for any particular transmittance value there are at least two possible potential differences which may be applied across the modulator 4 and this change in transmittance may instead correspond to an overall potential difference varying between $V_A'$ and $V_B'$. The invention enables these two possibilities to be distinguished since the variation in intensity of the detected laser beam will be in opposite senses depending on which part of the response characteristic the applied potential lies.

To achieve this discrimination, the square wave applied to the amplifier 14 is also applied to the demodulator 18. The laser beam may vary in phase with the square wave as shown in FIG. 4B corresponding to the overall potential difference applied varying between $V_A$ and $V_B$, or out of phase as shown in FIG. 4C corresponding with the applied potential varying between $V_A'$ and $V_B'$.

Figure 3:
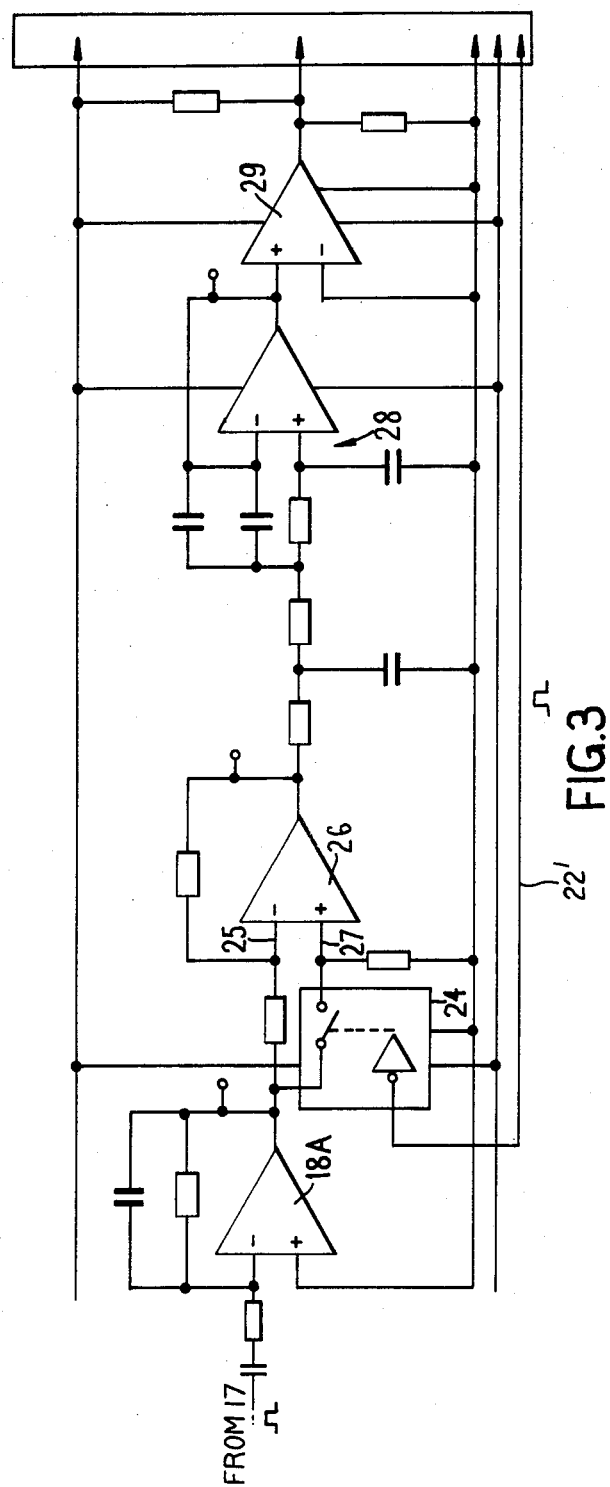
FIG. 3 illustrates in more detail the synchronous demodulator shown in FIG. 2.

The synchronous demodulator 18 is shown in more detail in FIG. 3 and comprises a conventional integrated switch 24 whose position is controlled by the square wave supplied by the generator 22 along a line 22'. The square wave signal from the detector 17 is fed via an amplifier 18A (such as an NSCLM348) to an inverting input 25 of an operational amplifier 26 (such as an NSCLM348) and via the switch 24 to a non-inverting input 27 of the amplifier 26. The amplifier 26 has a gain of unity and operates as an inverter or non-inverter according to the position of the switch 24. The output from the amplifier 26 is fed through a low pass filter 28 including an amplifier (such as a NSCLM348) to one input of a comparator 29 the other input of which is held at ground potential. The comparator 29 may comprise an NSCLM311N. For the purposes of this explanation, it will be assumed that the output signal from the detector 17 is such that the output from the amplifier 18A varies between +5 volts and −5 volts. When the switch 24 is closed, the amplifier 26, plus its associated resistors, acts as a non-inverting unit gain amplifier; whereas when the switch 24 is open the amplifier 26 acts as a unity gain inverter. If the square wave on the line 22' is in phase with the signal from the amplifier 18A as shown in FIG. 4B, the positive halves of the signal will be inverted but the negative halves will not so that the signal from the amplifier 26 will be a steady −5 volts. Alternatively, if the square wave on the line 22' is in anti-phase with the signal from the amplifier 18A as shown in FIG. 4C, then exactly the opposite arrangement will occur and the signal from the amplifier 26 will be a steady +5 volts. The output signal is fed through the loss pass filter 28 to deal with noise and the finite switching times of the switch 24 and the amplifier 26. It is then passed to the comparator 29 to give a clean switching signal.

The output from the synchronous demodulator 18 is fed to the MPU 19.

The MPU 19 can determine simply from the sign of the applied voltage received from the synchronous demodulator 18 whether it is to the left or right of beam extinction (as seen in FIG. 5). The MPU 19 then adjusts the applied bias voltage in a direction towards beam extinction and the operation is then repeated. The MPU 19 will typically alter the bias voltage using a process of successive approximation with each successive adjustment being smaller and typically half the size of the preceding adjustment. Up to 8 adjustments may be made during one test.

One of the main advantages of the invention is that where six beam modulators are provided accurate adjustment of their response characteristics can be individually made. This is despite the fact that detectors may not be available for discriminating between individual laser beams passing through the modulators 4 at the same time. However, if the MPU 19 causes the square wave modulated control voltage to be applied to only one modulator at a time, this modulating intensity can be detected by the detector 17 and clearly will relate only to the modulator under test. Typically, the MPU 19 will automatically carry out suitable adjustments just prior to the exposure stage when all the colour separations for any particular image are generated which takes up to 20 minutes. The test procedure or compensation stage itself will take only a very short time (about 5 seconds).

It should be readily apparent to the skilled reader that the apparatus could also be used at maximum beam transmission instead of beam extinction.

Figure 6:
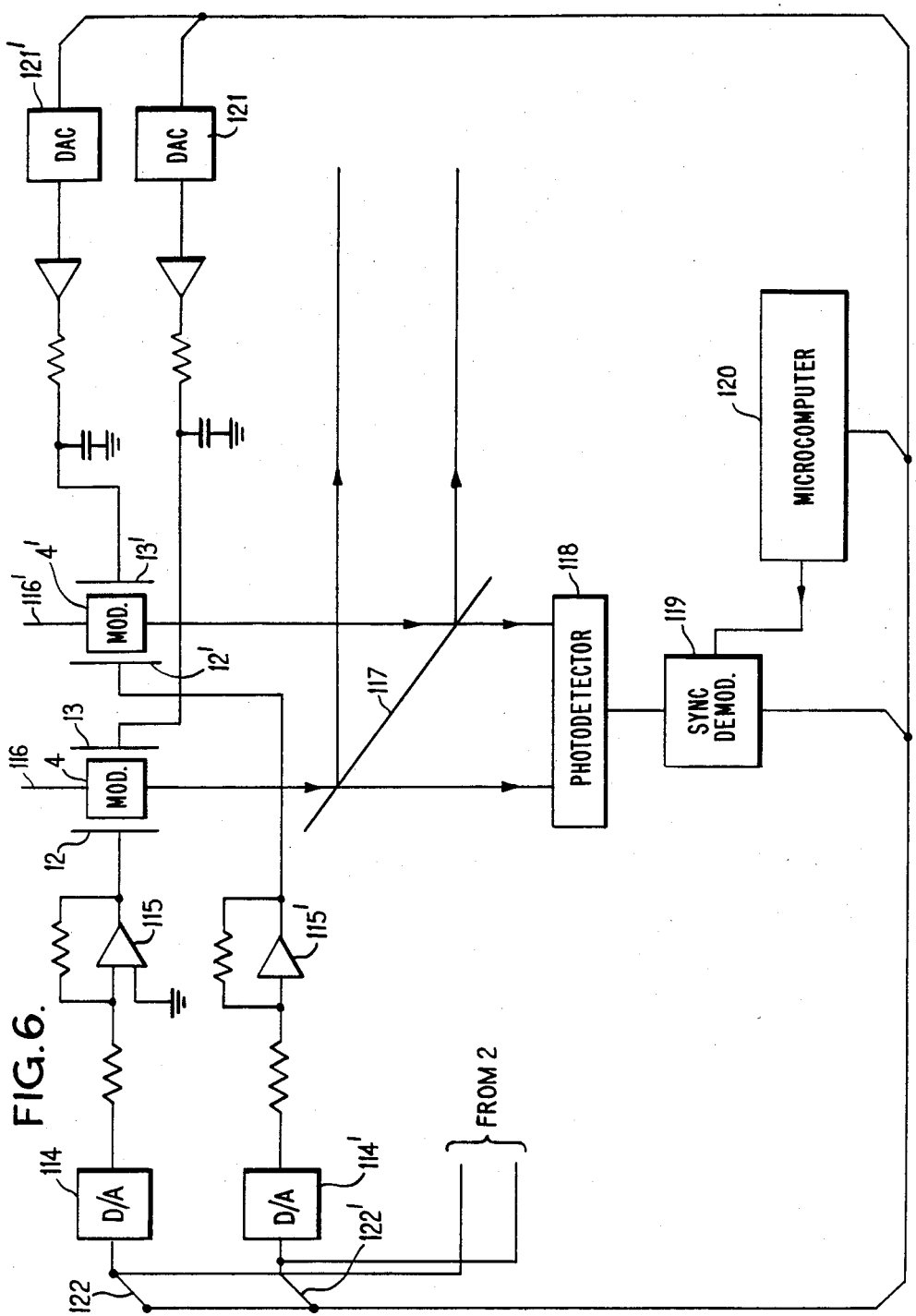
FIG. 6 is a view similar to FIG. 2 but of a second example.

FIG. 6 illustrates a second example of the apparatus. A pair of electro-optical modulators 4, 4' are controlled by respective pairs of electrodes 12, 13; 12',13'. The beam computers 2 apply individual control signals to a pair of D/A converters 114, 114' which pass corresponding analogue voltage signals via amplifiers 115, 115' (part of the amplifiers 3) to the electrodes 12, 12' respectively. The control signals from the beam computers 2 vary in such a way as to define a half-tone dot of the correct size for the colour separation in question at the particularly pixel being exposed.

A laser beam is split by a conventional beam splitter (not shown) into six separate subsidiary beams two of which 116, 116' are shown in FIG. 6. The beams 116, 116' pass through respective modulators 4, 4' and impinge on a semi-silvered mirror 117 where they are partially reflected towards the record medium 9 (not shown in FIG. 6). Non-reflected portions of the laser beams 116, 116' pass through the mirror 117 and are received by a common photodetector 118. The output from the photodetector 118 which is a signal proportional to the intensity received by the detector 118 is fed to a synchronous demodulator 119 of conventional form. A microcomputer 120 is provided to feed digital bias signals to a pair of D/A converters 121, 121' whose analogue output comprises a bias voltage fed to the electrodes 13, 13'. In addition, the microcomputer 120 generates digital test control functions (to be described below) which are fed to the D/A converters 114, 114'. The microcomputer 120 causes switches 122, 122' to connect selectively the microcomputer output to the D/A converters 114, 114'.

Initially, the bias voltages to be applied to the electrodes 13, 13' are determined. This could be achieved by a manual method but is preferably achieved under the control of the microcomputer 120. The microcomputer 120 causes one of the switches 122, 122' to connect its respective D/A converter 114, 114' to the microcomputer to receive a pair of digital values which are oscillated at a constant rate. These are superimposed on a signal from the respective beam computer 2 representing beam extinction and cause the beam transmitted through the respective modulator 4, 4' to oscillate in intensity. The synchronous demodulator 119 which is fed with the oscillating digital signals from the microcomputer 120 provides an output which is a continuous d.c. voltage signal detected by the microcomputer 120. The sign of this voltage signal indicates whether the voltage applied across the respective beam modulator lies to the left or right of beam extinction and the bias voltage applied to the electrode 13, 13' is then adjusted until beam extinction is achieved in a similar way to the previous example.

In a similar manner the voltage corresponding to maximum beam transmission could be determined. To achieve this automatically the microcomputer 120 causes one of the switches 122, 122' to connect its respective D/A converter 114, 114' to the microcomputer to receive a pair of digital values which are oscillated at a constant rate. These are superimposed on a signal from the respective beam computer 2 representing maximum beam transmission and cause the beam transmitted through the respective modulator 4, 4' to oscillate in intensity. The synchronous demodulator 119 which is fed with the oscillating digital signals from the microcomputer 120 provides an output which is a continuous d.c. voltage signal detected by the microcomputer 120. The sign of this voltage signal indicates whether the voltage applied across the respective beam modulator lies to the left or right of the maximum possible transmission and a corresponding adjustment is made in the signal from the beam computer 2.

We claim:

1. In the exposing of a record medium to radiation in which, during an exposing stage, said radiation passes through a modulator which comprises a device for controlling the transmission of radiation passing through the modulator in accordance with an applied control function, the response characteristic of the modulator to the control function exhibiting a maximum or minimum such that the exposure of said record medium to said radiation is controlled by applying a first control function to said modulator, a method of compensating for changes in the response characteristic of the modulator, comprising the steps of: applying a test control function having a DC component and a cyclically varying component to said modulator; monitoring radiation transmitted through said modulator; detecting the phase relationship between the cyclical component of said transmitted radiation and said cyclically varying component of said test control function to determine the position of said DC component of said test control function along said response characteristic of said modulator; and determine a correction function for application to said modulator to compensate for any change in said response characteristic, where said test control function applying, transmitted radiation monitoring, phase relationship detecting, and correction function determining steps are implemented during a compensation stage preceding said exposing stage.

2. A method according to claim 1, wherein the correction function is applied as a bias function to said modulator.

3. A method according to claim 1 wherein said DC component of said test control function has a value which is expected to cause one of maximum and minimum radiation transmission.

4. A method according to claim 1, wherein said cyclically varying component of said control function has a square wave form.

5. A method according to claim 1, wherein a plurality of beams of radiation pass through respective ones of a plurality of modulators, the method further comprising, during said compensation stage, causing said beams of radiation to impinge on a common detector and carrying out the steps of said compensation stage on each said modulator in turn, said component of said radiation incident on said detector having a cyclically varying intensity being monitored.

6. A method according to claim 5, wherein said DC component of said test control function has a value which is expected to cause one of maximum and minimum radiation transmission.

7. A method according to claim 5, wherein said cyclically varying component of said control function has a square wave form.

8. A method according to claim 1, wherein said radiation is optical radiation.

9. An exposure system comprising a radiation generator; a modulator onto which radiation from said generator is incident, said modulator comprising a device for controlling the transmission of radiation passing through the modulator in accordance with an applied control function, the response characteristic of the modulator to the control function exhibiting a maximum or minimum; control means for controlling the transmission condition of said modulator, said control means being responsive to predetermined control signals during an exposing stage and, during a compensation stage prior to said exposing stage, generating a test control function having DC component and a cyclically varying component for application to said modulator; monitoring means for monitoring radiation transmitted through said modulator; detecting means for detecting the phase relationship between the cyclical component of said transmitted radiation and said cyclically varying component of said test control function and for determining the position of said DC component of said test control function along said response characteristic of said modulator; and calculating means for determining a correction function for application to said modulator to compensate for any change in said response characteristic.

10. A system according to claim 9, the system having a plurality of beam modulators, and a common detector onto which beams from said beam modulators impinge during said compensation stage.

* * * * *